Oct. 9, 1934.  I. H. JUDD  1,975,850
TRUCK TRAILER COMBINATION
Filed Dec. 4, 1933   3 Sheets-Sheet 1
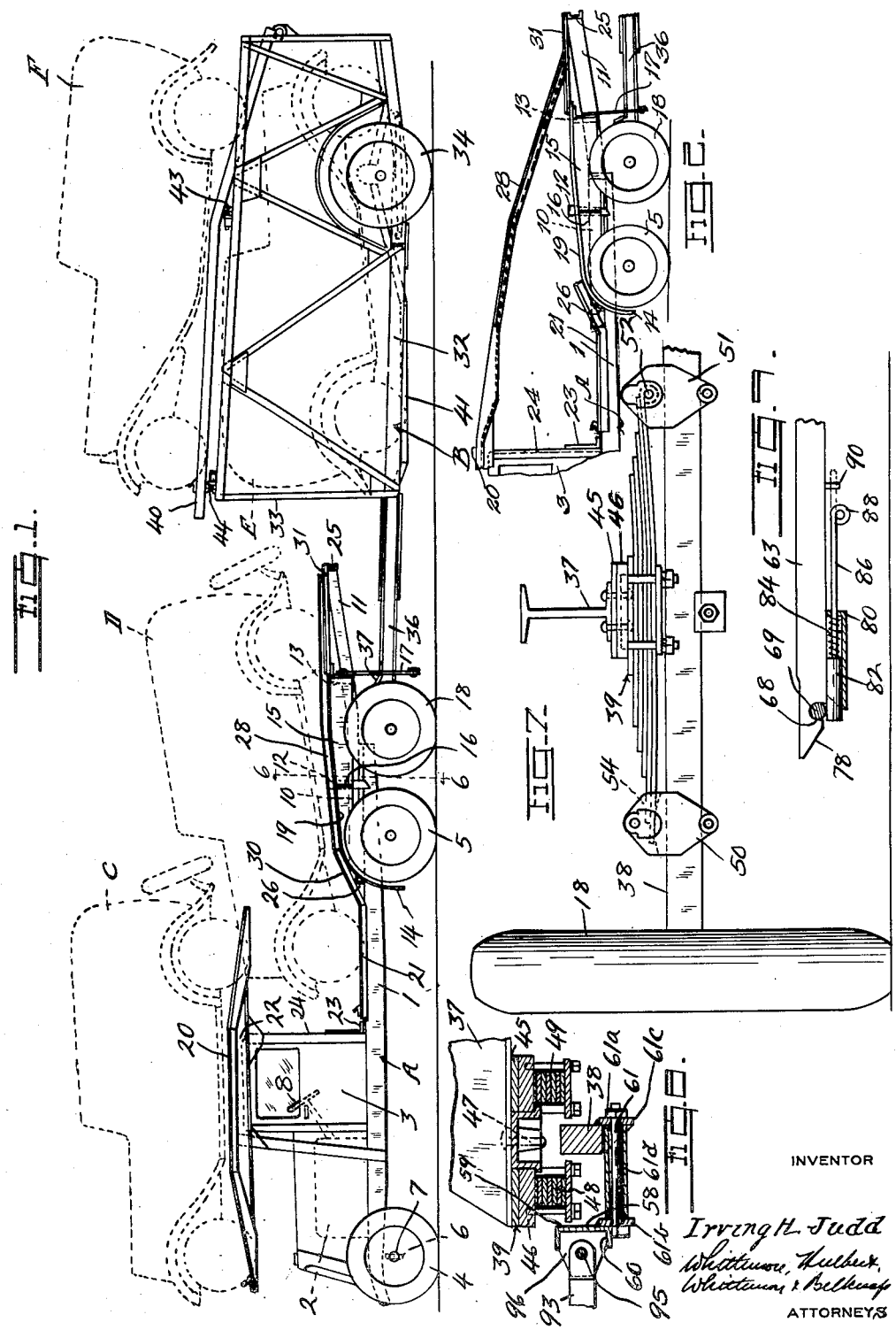
INVENTOR
Irving H. Judd
ATTORNEYS

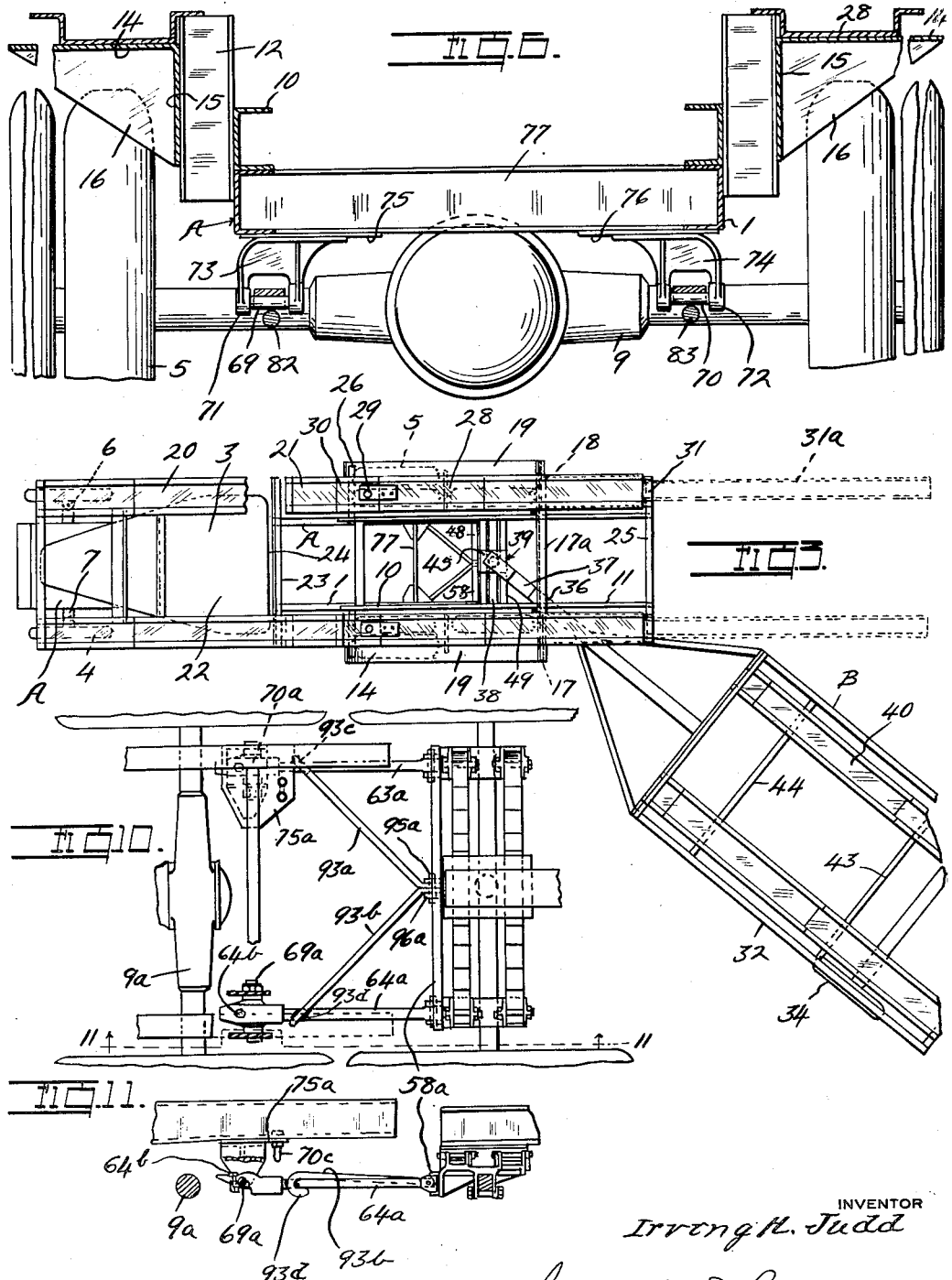

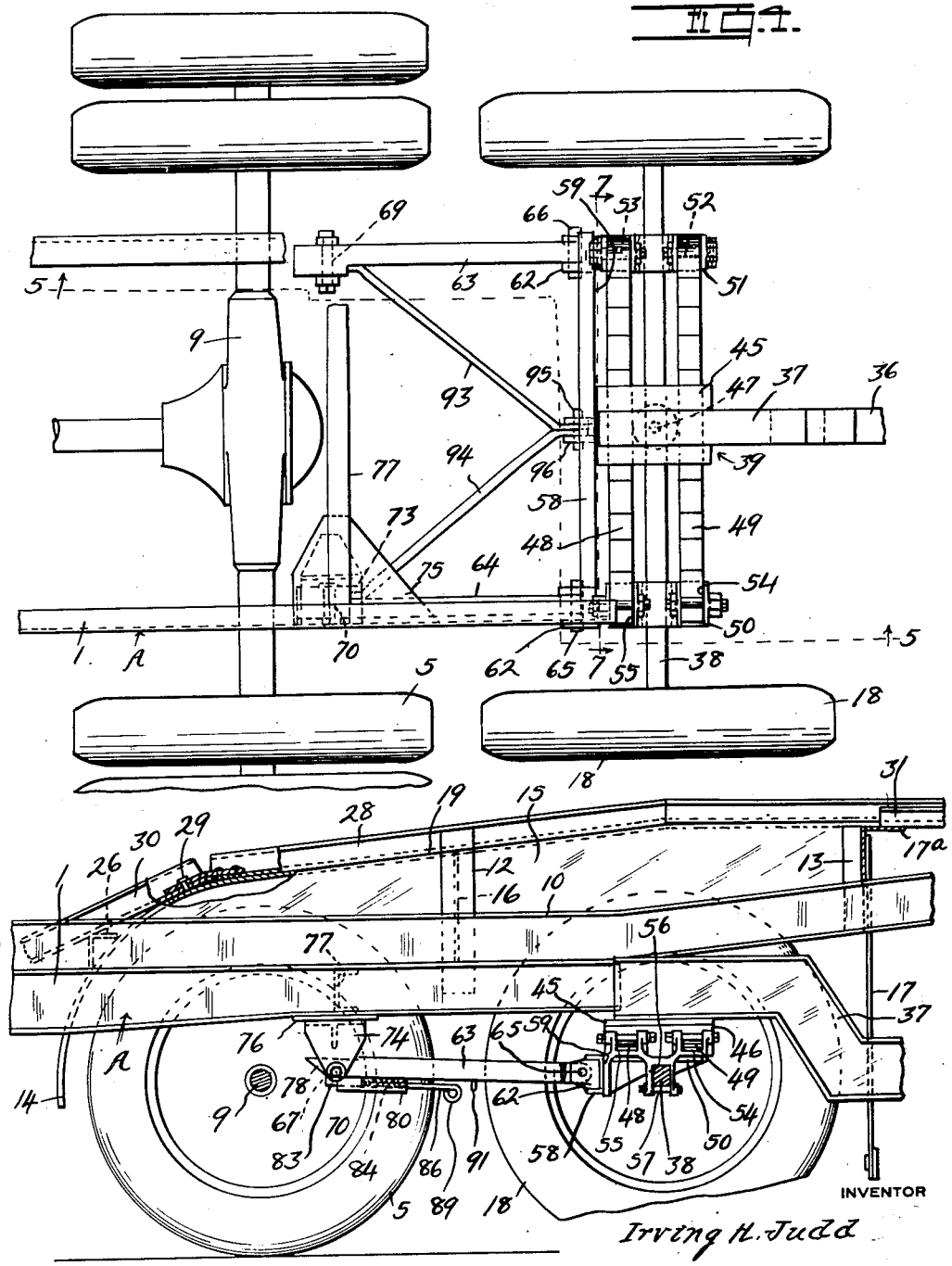

Patented Oct. 9, 1934

1,975,850

UNITED STATES PATENT OFFICE 1,975,850

TRUCK-TRAILER COMBINATION

Irving H. Judd, Detroit, Mich., assignor to Whitehead & Kales Company, River Rouge, Mich., a corporation of Michigan Application December 4, 1933, Serial No. 700,923

11 Claims. (Cl. 280—33.1)

This invention relates generally to means for transporting automobiles, and refers more particularly to truck-trailer combinations.

One of the essential objects of the invention is to provide a combination of the type mentioned wherein the front axle of a four-wheel trailer is connected to a truck in such a way that an increased loading space for automobiles to be transported is obtained.

Another object is to provide a truck-trailer combination wherein the connection between the trailer and truck is such that the four-wheel trailer will function like a semi-trailer and thus will be free of "snaking" or "whipping" action while in motion on a road.

Another object is to provide a truck-trailer combination wherein the connection between the truck and trailer is provided with means for compensating for irregular road surfaces.

Another object is to provide a truck-trailer combination wherein one of the pivots heretofore used and believed necessary when two four-wheel vehicles were coupled together, is dispensed with entirely.

Another object is to provide a truck-trailer combination wherein the adjacent axles of said vehicles are always parallel and are disposed beneath a portion of one of the vehicles so that the over-all length of the combination may be less without sacrificing any loading space.

Another object is to provide a truck-trailer combination wherein the front axle of the trailer is beneath and connected to the truck in such a way that an automobile may be carried by the truck over the connection but without subjecting the trailer to any weight of the truck.

Another object is to provide a truck-trailer combination wherein the connection between said vehicles is provided with means for constantly maintaining the front axle of the trailer parallel to the rear axle of the truck.

Other objects, advantages and novel details of construction of this invention will be made more apparent as this description proceeds, especially when considered in connection with the accompanying drawings, wherein:

Figure 1 is a side elevation of a truck-trailer combination embodying my invention;

Figure 2 is a fragmentary elevation of the combination illustrated in Figure 1 with the portion 28 of the lower track inclined upwardly and connected to the rear end of the upper track 20;

Figure 3 is a top plan view of the combination when the truck is "jackknifed" relative to the trailer and is provided with skids so that automobiles may be loaded onto the truck without moving longitudinally of the trailer;

Figure 4 is a fragmentary top plan view of the combination with parts broken away and in section;

Figure 5 is a sectional view taken on the line 5—5 of Figure 4 with parts broken away;

Figure 6 is a sectional view taken on the line 6—6 of Figure 1;

Figure 7 is a sectional view taken on the line 7—7 of Figure 4;

Figure 8 is an enlarged vertical sectional view through the fifth wheel assembly and associated parts;

Figure 9 is a fragmentary elevation of one of the draw bars and associated latch mechanism showing one of the pins 69 in operative latched position;

Figure 10 is a fragmentary top plan view of a slight modification;

Figure 11 is a sectional view taken on the line 11—11 of Figure 10.

Referring now to the drawings, A is the truck and B is the trailer of a combination embodying my invention. As shown, the truck A has a chassis frame 1 carrying an engine 2 and a driver's cab 3 and provided with front and rear ground-engaging wheels 4 and 5 respectively. As usual, the front wheels 4 are mounted on spindles 6 pivotally connected to the front axle 7 and operable from a suitable steering wheel 8 within the cab. The rear wheels 5 are preferably arranged in pairs at opposite ends of the rear axle 9 and are adapted to be driven in the usual way from the engine 2.

10 is an auxiliary frame mounted on and having a portion 11 inclining upwardly and rearwardly from the chassis frame 1. 12 and 13 respectively are uprights rigid with and projecting above the auxiliary frame 10, 14 are wheel fenders disposed upon the outer sides of and having depending portions 15 rigid with the uprights 12 and 13, and 16 are reinforcing gussets for the fenders. In this connection it will be noted that the fenders 14 are elongated in form so as to cover the front wheels 18 of the trailer as well as the rear wheels 5 of the truck, the rear end portions 17 of said fenders being formed of flexible or yieldable material such as rubber, rubber composition or weighted canvas and normally hanging in a vertical plane from an angle crossbar 17a rigid with the top portions 19 of said fenders. Thus, the flexible portions 17 will afford clearance when the trailer is being coupled or uncoupled. Moreover, the tops 19 of such fenders are slightly inclined as shown instead of being curved longitudinally.

Preferably the truck A is designed to carry two automobiles and for this purpose is provided with upper and lower tracks 20 and 21 respectively. As shown, the upper track 20 is mounted on and extends forwardly and rearwardly beyond the top 22 of the cab, while the lower track 21 is mounted on and extends forwardly and rearwardly beyond the inclined portions 19 of the wheel fenders. The upper track 20 is preferably of sufficient length to carry a 119" wheel base automobile C while the lower track 21 is sufficiently long to carry a 136" wheel base automobile D. In this connection it will be noted that the upper and lower tracks 20 and 21 are staggeredly arranged and that the lower track 21 extends from an angle iron 23 that crosses the chassis frame 1 at the back 24 of the cab to a channel crossbar 25 at the rear end of the auxiliary frame 10. Angle irons 26 project laterally from the auxiliary frame 10 in advance of the fenders 14 and cooperate with the angle iron 23 to support the track 21, while the angle bar 17a cooperates with the crossbar 25 to support the track. To facilitate loading of the upper track 20, an intermediate portion 28 of the lower track 21 is used as a skid between the tracks 21 and 20. Normally, this portion 28 is bolted at 29 to the inclined portion 30 of the lower track and is nested in the rear portion 31 of said track. However, when it is desired to load or unload the upper track 20, the portion 28 is detached from the inclined portion 30 of the lower track and is fastened to the rear end of the upper track, as illustrated in Figure 2.

The trailer B has a chassis frame 32 carrying upright side frames 33 and provided with front and rear ground-engaging wheels 18 and 34 respectively. Preferably, the chassis frame 32 at the forward ends of the upright side frames is Y-shaped in plan and the stem 36 of the Y has an upwardly offset portion 37 at its forward end extending over and connected to the front axle 38 of the trailer by a fifth wheel 39. The trailer B also carries two automobiles and for this purpose has upper and lower tracks 40 and 41 respectively which may be loaded by skids (not shown) from the ground. Preferably the lower track 41 is carried by the chassis frame 32 between the upright side frames 33 and is sufficiently long to carry a 130" wheel base automobile E, while the upper track 40 is carried by hingedly mounted crossbars 43 and 44 respectively on the side frames 33 and is sufficiently long to carry a 136" wheel base automobile F.

Preferably the upper plate 45 of the fifth wheel 39 is rigid with the offset portion 37 of the frame, while the lower plate 46 of the said fifth wheel is connected to the upper plate 45 by a king pin 47 and is rigid with the centers of transversely extending leaf springs 48 and 49 respectively, terminally engaging suitable brackets 50 and 51 respectively rigid with the front axle 38 of the trailer. As shown, the springs 48 and 49 are fastened by bolts 52 and 53 respectively to the brackets 51 and have slip engagement with suitable slots 54 and 55 respectively in the brackets 50. Preferably both brackets 50 and 51 have inverted U-shaped portions 56 straddling the axle 38 and fastened thereto by bolts 57.

58 is a channel crossbar in advance of the brackets 50 and 51 and disposed parallel to the axle 38. Preferably the base 59 of the channel 58 bears against and is secured to the front faces of the brackets 50 and 51, while the lower side 60 of said crossbar is connected to the axle 38 by a bolt 61 and nut 61a, suitable brackets 61b and 61c being welded to the crossbar 58 and axle 38 respectively and receiving said bolt. A tube 61d is sleeved upon the bolt 61 between said brackets and serves as a spacer.

62 are parallel plates secured in the channel crossbar 58 at opposite ends thereof, 63 and 64 respectively are parallel draw bars connected by horizontal pivot pins 65 and 66 respectively to said parallel plates 62 and having transversely extending slots 67 and 68 respectively therein at their forward ends for receiving horizontal pins 69 and 70 respectively carried by bifurcated portions 71 and 72 respectively of brackets 73 and 74 respectively rigid with gussets 75 and 76 respectively welded to the crossbar 77 of the chassis frame 1 of the truck. As shown, the draw bars 63 and 64 are movable forwardly and rearwardly in the bifurcated portions 71 and 72 over the pins 69 and 70 and have beveled faces 78 to facilitate engagement with and removal from the pins. Bosses 80 respectively are fixed to the undersides of the draw bars 63 and 64 and contain large bolts or plungers 82 and 83 respectively which are normally held forwardly across the slots 67 and 68 by coil springs 84 and are retractable by manually operable pull rods 86. Preferably these pull rods 86 are swivelly connected to the latch bolts 82 and 83 so that they may be turned ninety degrees and have eyes 88 and 89 respectively at their rear ends that may be engaged with pins 90 and 91 respectively projecting downwardly from the draw bars 63 and 64 when it is desired to retain the latch bolts 82 and 83 in retracted position.

93 and 94 respectively are diagonal braces or radius rods welded to the draw bars 63 and 64 adjacent their forward ends and converging rearwardly toward and pivotally connected to a pivot pin 95 carried by parallel plates 96 welded to the crossbar 58 at the center thereof.

Thus, the pin 95 cooperates with the pins 65, 66, 69 and 70 to provide a five-point pivotal connection to compensate for irregular road surfaces. Moreover, the construction is such that the front axle 38 of the trailer will be held constantly parallel to the rear axle 9 of the truck as long as the trailer draw bars 63 and 64 are connected to the truck.

In use, when the trailer B is connected to the truck A, the pull at opposite sides of the combination is from the truck chassis frame 1 through parts 75 and 76, 73 and 74, 69 and 70, 63 and 64, 65 and 66, 58, and 50 and 51 to the front axle 38 of the trailer, while the pull at the center is through parts 93 and 94, 58, 61b, 61, and 61c to said axle 38. Thus, the trailer B is connected to the truck A by means beneath the truck, but the construction and arrangement is such that no load of the truck is carried by such means or by the trailer. Inasmuch as the front axle 38 of the trailer is held parallel to the rear axle of the truck and carries the fifth wheel 39, no other pivot means for the trailer is needed. Consequently, the four-wheel trailer will function like a semi-trailer and will be free of "snaking" or "whipping" action while in motion on a road. In this connection, it will be noted that the front axle 38 of the trailer is beneath the truck. Thus, the linear dimension of the combination is less but an increased loading space for automobiles to be transported is obtained.

When loading the combination, the trailer B may be in alignment with the truck A as illustrated in Figure 1 or the truck A may be "jack-knifed", i. e., turned at an angle relative to the trailer B as illustrated in Figure 3. When the parts are in alignment, the combination is loaded by first swinging the upper track 40 of the trailer upwardly over one upright side frame 33 to an inoperative position for clearance purposes and then driving automobile C from the ground up skids (not shown) attached to the rear end of the trailer over track 41 between the upright side frames 33 up skids (not shown) onto track 21 on the truck, then up track section 28 (Figure 2) onto track 20. Track section 28 is then returned to nested position with section 31 of track 21. Automobile D is then driven from the ground up the skids attached to the rear end of the trailer B over track 41 between the upright side frames 33 up skids onto track 21 beneath the rear end of automobile C (Figure 1). Automobile E is then driven from the ground up skids onto track 41. The track 40 is then returned to lowered operative position (Figure 1), and finally automobile F is driven from the ground up skids (not shown) onto said track 40. When the truck A is "jack-knifed" (Figure 3), then automobiles C and D are driven from the ground up skids 31a onto the tracks 20 and 21 respectively without moving over track 41 between the upright side frames 33 of the trailer. Thus, larger automobiles having a greater over-all width than the distance between the upright side frames 33 may be loaded onto tracks 20 and 21 when the truck is "jack-knifed" as aforesaid.

In Figures 10 and 11 I have illustrated a slight modification in which the draw bars 63a and 64a respectively of the trailer are fastened by bolts 64b to the pins 69a and 70a in rear of the rear axle 9a of the truck. In this construction the radius rods 93a and 93b have hooked portions 93c and 93d embracing and welded to the draw bars 63a and 64a and are connected at their rear ends to a pivot pin 95a carried by parallel plates 96a welded to the crossbar 58a at the center thereof. Any suitable means (not shown) may be engaged with U-shaped bolts 70c depending from the plates 75a when the draw bars 63a and 64a are uncoupled from the pins 69a and 70a for carrying the forward ends of the draw bars. Otherwise, the construction and arrangement is substantially the same as in Figures 1 to 9, inclusive.

What I claim as my invention is:

1. A truck trailer combination comprising a truck having a frame and front and rear axles provided with ground engaging wheels, a trailer having a frame and front and rear axles provided with ground engaging wheels, the front axle of the trailer and the rear axle of the truck being substantially parallel, said trailer also having a fifth wheel permitting the frame thereof to turn relative to the parallel axles aforesaid, and a connection between the truck and trailer permitting the wheels of the trailer and the wheels of the truck to constantly assume their respective loads and constantly maintaining the parallel relation between the axles aforesaid while the combination is moving forwardly, rearwardly, or turning.

2. A truck trailer combination comprising a trailer having a frame and front and rear axles provided with ground engaging wheels, a truck having a frame and front and rear axles provided with ground engaging wheels, the front axle of the trailer and the rear axle of the truck being substantially parallel and beneath the frame of said truck, said trailer also having a fifth wheel permitting the frame of the trailer to turn relative to the parallel axles aforesaid while the combination is in transit, and a connection between said truck and trailer permitting the wheels of the trailer and the wheels of the truck to continually assume their respective loads and constantly maintaining the parallel relation aforesaid between said axles regardless of the position of the trailer frame relative thereto.

3. A truck trailer combination comprising a trailer having a frame and front and rear axles provided with ground engaging wheels, a truck having a frame and front and rear axles provided with ground engaging wheels, the rear wheels of the truck being in tandem with but free of the weight of the front wheels of the trailer, the axle for the front wheels of the trailer and the axle for the rear wheels of the truck being substantially parallel, a fifth wheel connection between the front axle and frame of the trailer, and a draft connection between the truck and trailer including independent substantially parallel draw bars extending between said truck and trailer and adapted to maintain the parallel relation aforesaid between the front axle of the trailer and the rear axle of the truck while permitting movement of the trailer frame upon said fifth wheel.

4. A truck trailer combination comprising a truck having a frame and transversely extending front and rear axles provided with ground engaging wheels, a trailer having a frame and transversely extending front and rear axles provided with ground engaging wheels, a separable draft connection between the truck and trailer including independent substantially parallel draw bars extending between said truck and trailer and adapted to hold the front axle of the trailer parallel to the rear axle of the truck, and means permitting the trailer frame to turn relative to said parallel axles when the vehicles are connected and permitting the trailer to be moved and steered on its own wheels independently of the truck when free thereof comprising only one pivotal connection between the trailer front axle and its frame.

5. A truck trailer combination comprising a trailer having a frame and front and rear axles provided with ground engaging wheels, a truck having a frame and front and rear axles provided with ground engaging wheels, a fifth wheel connection between the front axle and frame of the trailer permitting the trailer to be moved and steered on its own wheels independently of the truck when free thereof, and a draft connection between the truck and trailer constantly maintaining the front axle of the trailer and the rear axle of the truck in parallel relation and permitting each vehicle when coupled to the other to be carried by its own wheels without subjecting either vehicle to any of the load of the other.

6. A truck trailer combination comprising a trailer having a frame and front and rear axles provided with ground engaging wheels, a truck having a frame and front and rear axles provided with ground engaging wheels, said trailer also having a fifth wheel permitting the frame thereof to turn relative to the front axle of the trailer, a connection between the truck and trailer constantly maintaining the front axle of the trailer and the rear axle of the truck in parallel relation and permitting each vehicle to be carried by its own wheels without subjecting either vehicle to any load of the other, said fifth wheel and draft connection being so located relative to the parallel axles aforesaid that an open load carrying area is provided over said connections.

7. A truck trailer combination comprising a truck having a frame and a transversely extending rear axle, a trailer having a frame and a transversely extending front axle, the axle of the truck being arranged in tandem with the axle of the trailer, the axle of the truck being free of the weight of the trailer, said trailer also having a fifth wheel permitting the frame thereof to turn relative to the tandem wheels aforesaid, and a connection between the trailer and truck including means for holding the trailer axle parallel to the rear axle of the truck while permitting movement of the trailer frame on said fifth wheel relative to both axles, the construction and arrangement of the fifth wheel and associated parts being such that the fifth wheel constitutes the sole vertical pivotal connection between the truck and trailer and both vehicles are carried by their own wheels when connected together as aforesaid.

8. A truck trailer combination comprising a truck having a frame and front and rear axles provided with ground engaging wheels, a trailer having a frame and front and rear axles provided with ground engaging wheels, the front axle of the trailer being beneath the frame of the truck and connected to the latter in such a way that an automobile may be carried by the truck over the connection without subjecting either vehicle to the weight of the other.

9. A truck trailer combination comprising a truck having a frame and front and rear axles provided with ground engaging wheels, a trailer having a frame and front and rear axles provided with ground engaging wheels, said trailer also having a fifth wheel permitting the frame thereof to turn relative to the front axle of the trailer, and means independent of said fifth wheel connecting the truck and trailer so that each vehicle may be supported upon its own wheels while in transit, said means constantly holding the front axle of the trailer parallel with the rear axle of the truck but permitting the frame of the trailer to turn as aforesaid.

10. A truck trailer combination comprising a truck having a frame and front and rear axles provided with ground engaging wheels, a trailer having a frame and front and rear axles provided with ground engaging wheels, and a connection between the front axle of the trailer and the rear axle of the truck constantly maintaining said axles in parallel relation to each other and allowing the weight of each vehicle to be carried by its own wheels.

11. A truck trailer combination comprising a truck having a frame and front and rear axles provided with ground engaging wheels, a trailer having a frame and front and rear axles provided with ground engaging wheels, and a connection between the front axle of the trailer and the rear axle of the truck constantly maintaining said axles in parallel relation allowing said axles to compensate independently of each other for irregular road surfaces.

IRVING H. JUDD.